Figure 1:
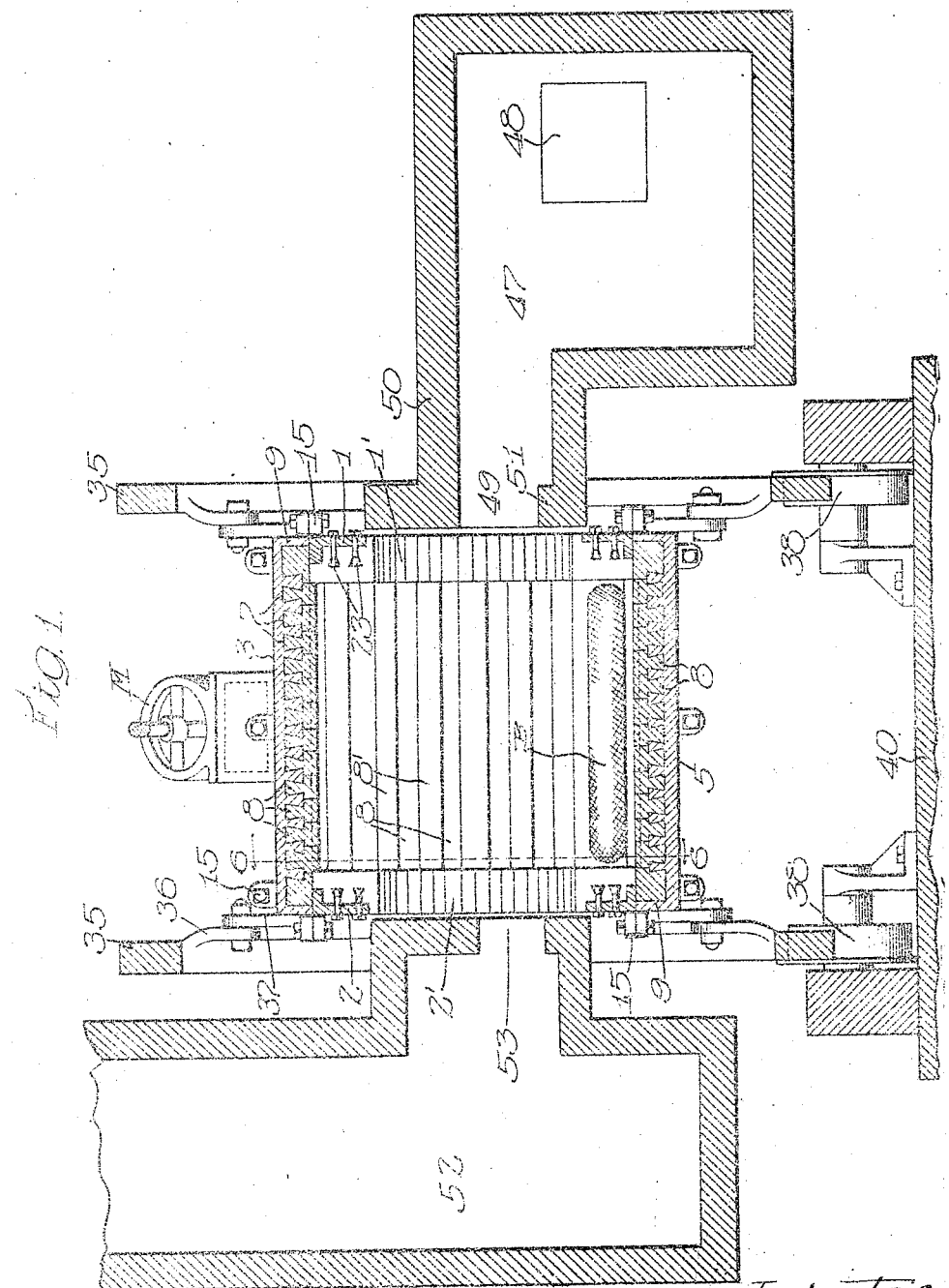

W. C. ELY.
PROCESS OF PRODUCING BLOOMS FROM SCRAP METAL.
APPLICATION FILED DEC. 21, 1911.

1,155,409.

Patented Oct. 5, 1915.
5 SHEETS—SHEET 1.

W. C. ELY.
PROCESS OF PRODUCING BLOOMS FROM SCRAP METAL.
APPLICATION FILED DEC. 21, 1911.

1,155,409.

Patented Oct. 5, 1915.
5 SHEETS—SHEET 4.

Witnesses:
H. H. Marus Jr.
R. Burkhardt.

Inventor:
Walter C. Ely,
By Bauer & Hof...
Attys

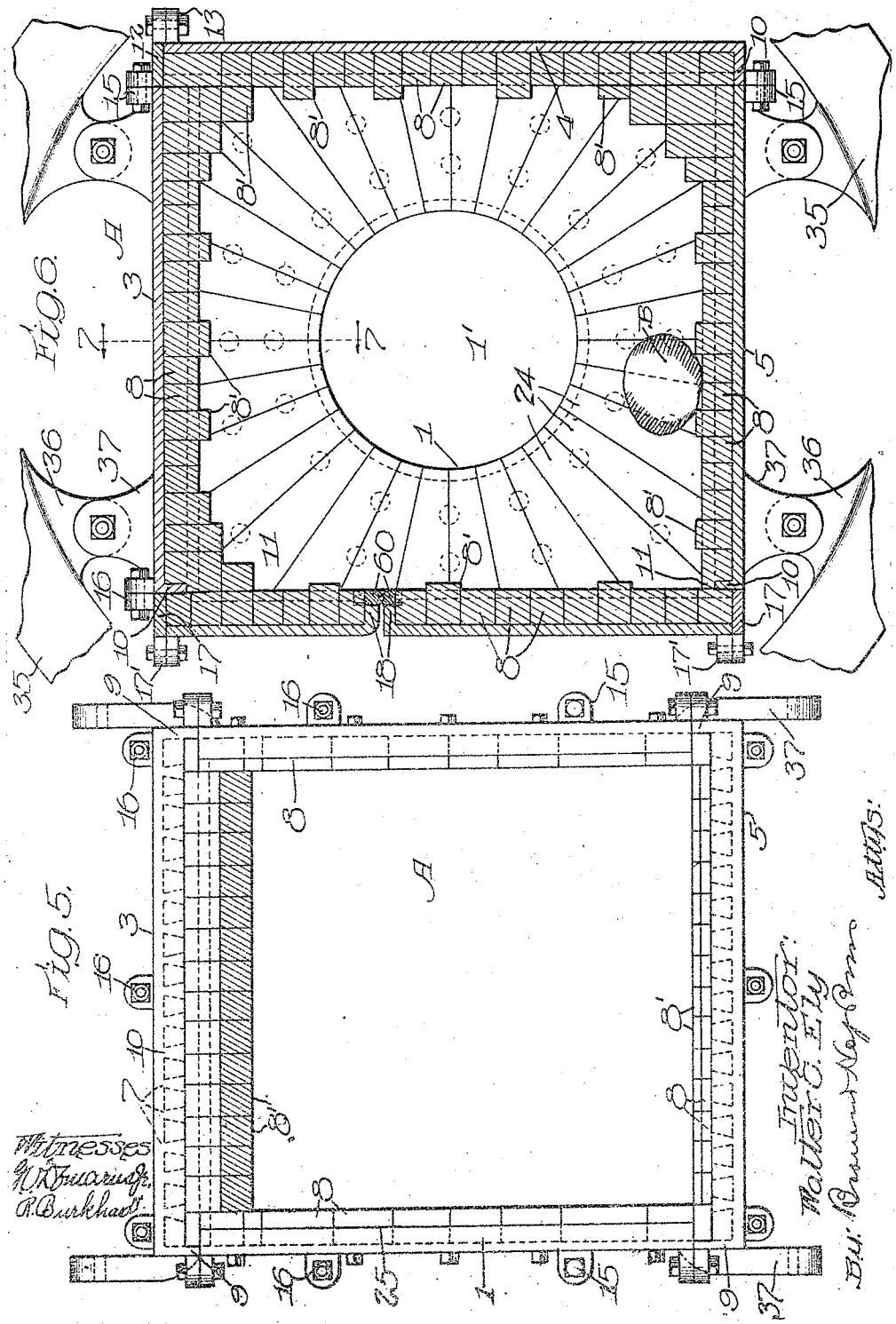

UNITED STATES PATENT OFFICE.

WALTER C. ELY, OF TERRE HAUTE, INDIANA.

PROCESS OF PRODUCING BLOOMS FROM SCRAP METAL.

1,155,409. Specification of Letters Patent. Patented Oct. 5, 1915.

Application filed December 21, 1911. Serial No. 667,179.

*To all whom it may concern:*

Be it known that I, WALTER C. ELY, a citizen of the United States, residing at Terre Haute, in the county of Vigo and State of Indiana, have invented a certain new, useful, and Improved Process of Producing Blooms from Scrap Metal, of which the following is a full, clear, and exact description.
My invention relates to the art of reworking metal scrap, and the terms "metal scrap", "scrap metal" and "charge" herein are to be understood as embracing any of the metal, such as steel and iron scrap, puddled iron and the like, which may be reworked to form blooms.

The object of my invention is to produce a workable bloom directly from scrap metal without resort to intermediate steps or operations. Pursuant to this, my object is to provide a simplified and improved process of handling and working scrap metal, by which process a quantity of loose metal scrap may be directly massed or converted into the form of a homogeneous, purified, workable bloom.

A further object is to provide an improved process for working scrap metal which may be mechanically carried into effect by means of suitable apparatus and in such manner as to dispense with skilled labor in the working of the metal and the production of workable blooms.

I prefer that my invention be carried into effect by heating the metal scrap to a viscous state in a straight or generally straight walled chamber or receptacle, and relatively rolling or working the viscous metal into an elongated mass on a wall of the chamber and maintaining the longitudinal axis of the forming mass substantially parallel with a straight portion of the chamber wall. In carrying out my improved process in this manner, the viscous metal may be formed into an elongated mass by a relative manipulating movement of the metal and the surface, but where rapid and thorough results are to be accomplished and large quantities of metal scrap are to be handled, the more satisfactory arrangement is to cause the heated charge to travel along a suitably formed surface by its own weight until a bloom-like formation takes place. I have therefore shown in the accompanying drawings, a power controlled and operated furnace which mechanically carries out my process in this manner. This furnace is of the type which constitutes the subject matter of my companion application, Serial Number 667,180, filed December 21, 1911, entitled, metal working furnace, and which represents an example of suitable apparatus for carrying my invention into effect, and it is in connection with this furnace that I will fully describe my present invention.

Figure 2:
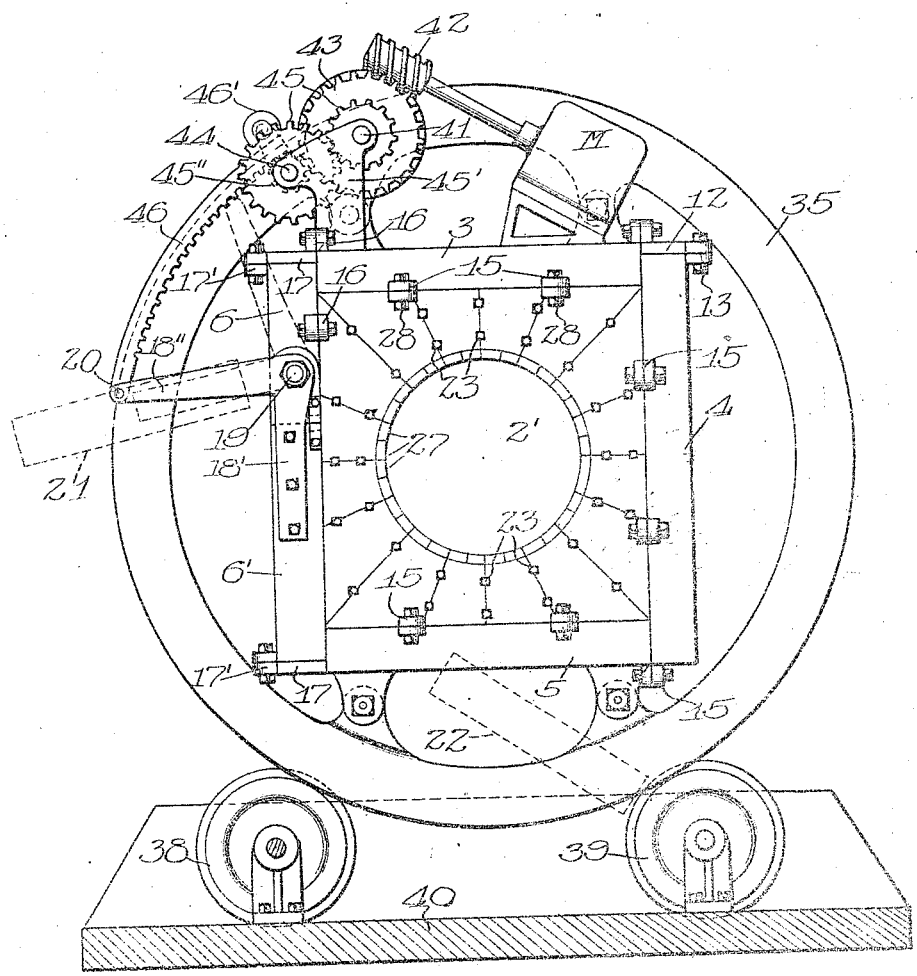
Figure 3:
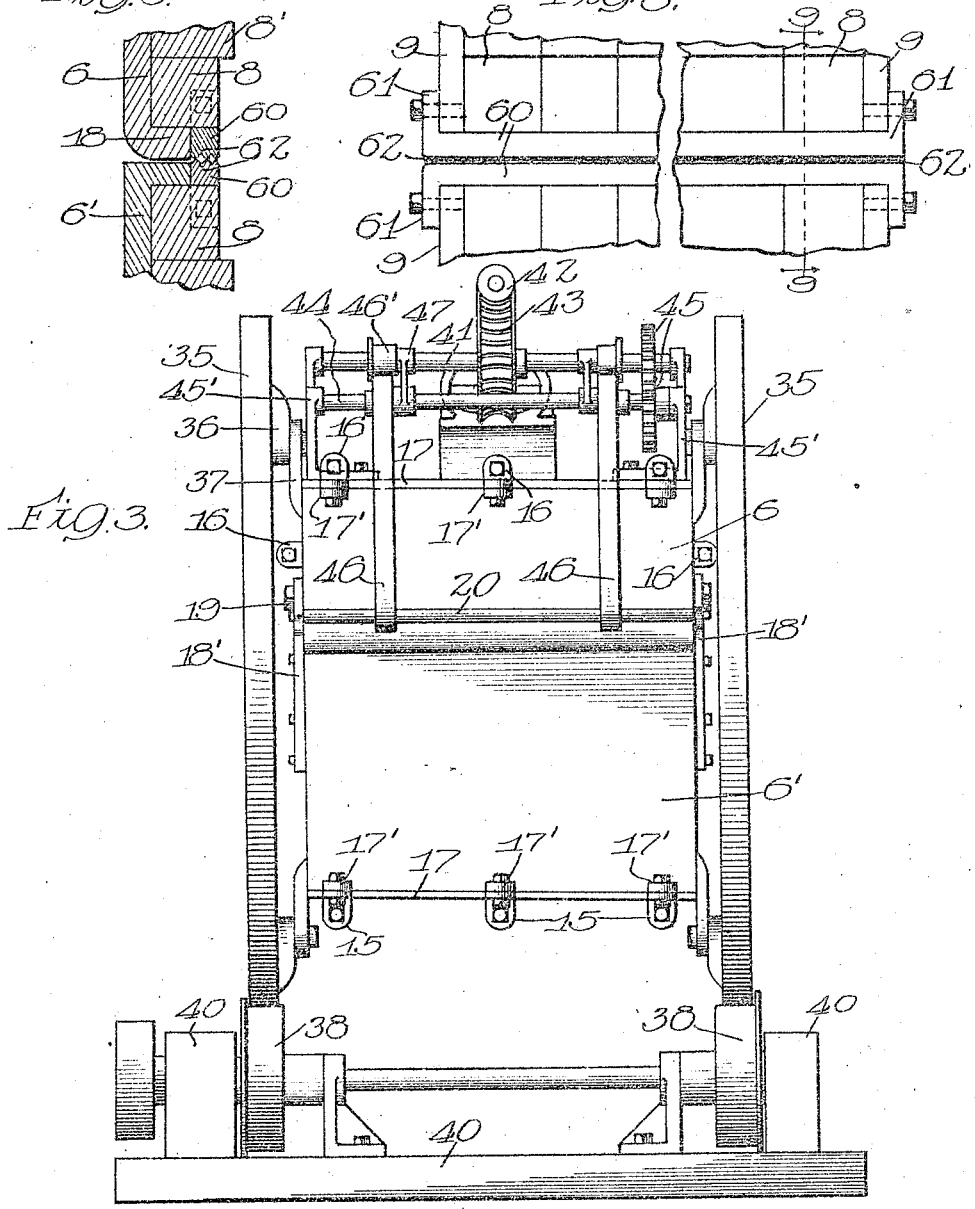
Figure 4:
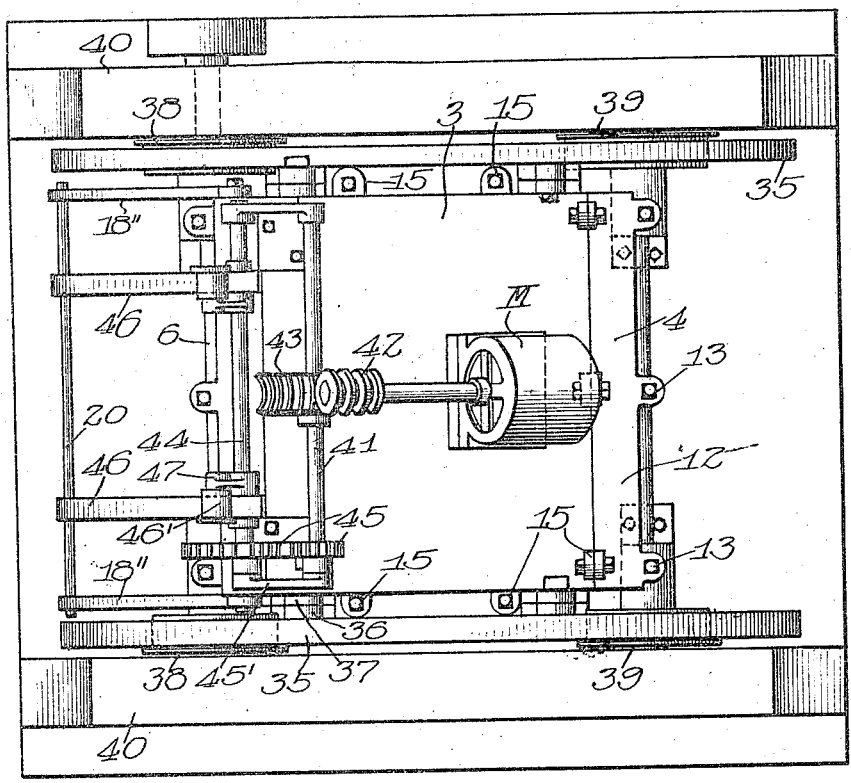
Figure 7:
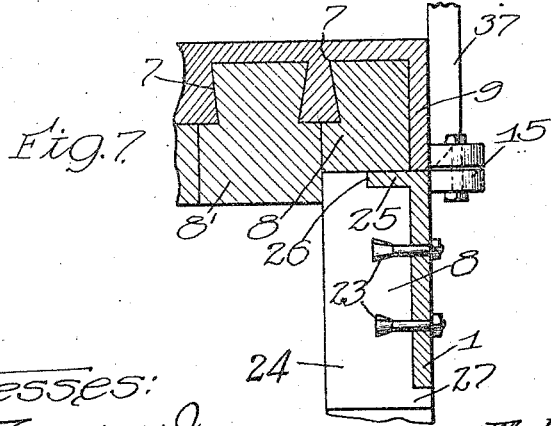

In the accompanying drawings, Figure 1 is a sectional view illustrating the abovementioned furnace in operating relation to a fuel combustion chamber and a stack from which the heat is derived and carried off; Fig. 2 is an end elevation of the furnace, one of the supporting wheels being removed to better disclose the parts; Fig. 3 is a side elevation of the furnace shown in Fig. 2;
Fig. 4 is a top plan view thereof; Fig. 5 is an enlarged side view of the heating chamber with the side or door plate removed; Fig. 6 is an enlarged transverse vertical section of the furnace chamber on the line 6—6 of Fig. 1; Fig. 7 is an enlarged detail section on line 7—7 of Fig. 6 showing the manner in which the end plates and side plates are lined with fire brick, and also the manner in which these plates fit together; and Figs. 8 and 9 are details enlarged to show the cheek plates at the edges of the door and upper side plate sections, Fig. 9 being a section on line 9—9, Fig. 8.

The apparatus shown in the drawings is designed for rapid work and large charges, much larger in fact than the present manual and mechanical furnaces, all of which produce "balls" of metal which must necessarily be put through a separate, or intermediate "squeezing" process before the mass of metal can be utilized.

The structure shown may be called a gravity furnace in the sense that the chamber in which the metal is heated is rotated or oscillated, and the metal, due to the action of gravity is caused to travel along the interior surface thereof. In this structure the metal working surface is arranged in substantially the form of a rectangle and forms a continuous path for the charge. In the direction of the longitudinal axis of the charge, however, this surface is straight, and is preferably maintained level at all times during the rotation or oscillation of the furnace so that the action of gravity will cause the metal to move uniformly and not pile up at one end of the furnace. The metal working chamber is indicated generally by A. Its rectangular shape possesses advantages over other geometrical forms, these advantages appearing as this description proceeds. The heating chamber is composed of a plurality of rectangular iron plates which constitute the end and side walls, the interior faces of which are suitably lined with refractory material. The end walls 1 and 2 have central circular openings 1' and 2' respectively to admit the heat to, and allow the escape of waste heat and gases from, the chamber so that the furnace may be rotated while the metal is being heated. The side walls are formed by four plates, 3, 4, 5 and 6, and constitute the metal working surface. The side plate 6 is made in two sections, the section 6' of which forms a swinging door. Each of these plates is provided with an independent lining of refractory material.

In practice I make the linings for the plates of individual fire bricks, although for the purposes of my invention the interior of the furnace may be lined in any manner found to be best adapted to the particular conditions. However, as before intimated, I prefer to construct all of the furnace parts in such manner that they may be readily assembled and disassembled. For these reasons I provide the side plates 3, 4 and 5 with a plurality of parallel dove-tail grooves 7 on their inner faces, so that they may be independently lined, as clearly shown in Figs. 1, 5, 6 and 7. The bricks in all of the side walls are correspondingly dove-tailed and are fitted into the grooves in rows. These plates are finished off on their end edges by flanges which reach to the height of the bricks, and one end of the dove-tailed grooves is closed by a flange 10, the other end being open to permit insertion and removal of the bricks. In the case of the plates 3 and 5 this flange 10 reaches to about half the height of the bricks and the adjacent end bricks overhanging the flanges as at 11 to protect the plate from heat; while in the case of the plate 4 the flange 10 is equal in height to that of the end flange 9, as shown in Fig. 6.

The bricks are firmly held against movement in the slots or grooves by pressure. For this purpose the side plate 4 is provided with an end-cap 12, which is removably clamped against the ends of the rows of bricks by several lugs and bolts 13 distributed along the edge of the plate and cap. This plate 4 is constructed in this manner so that it may be conveniently removed or replaced as a unit without disturbing the other plates, to facilitate relining the furnace. I utilize this plate as cap for the plates 3 and 5, as clearly shown in Fig. 6, instead of a separate cap. The side plate 4 has a plurality of lugs 15 cast at points around its edge and these register with corresponding lugs on the side plates 3 and 5, and the end plates 1 and 2. These lugs and the clamping bolts passing through them provide simple but effective fastenings for the plate 4. The door plate 6 and the bricks therefor are constructed similar to the other side plates particularly the plate or wall 4, and, like the plate 4, are removable without disturbing the other parts of the furnace. As shown only the upper section thereof, however, is fastened by the bolts and lugs 16 distributed on the edges thereof, the lower section being left free to swing as a door. On account of the fact that this plate is made in two sections, it is necessary that an end cap 17 be provided for each section so that each section may be relined independently.

The caps 17 are removably secured by the bolts and lugs 17', and are placed at opposite edges so that the plate flanges 18 which close the ends of the dove-tail grooves will both be at the division line between the two sections (see Figs. 6, 8 and 9), and thus provide a suitable mounting for the cheek plate 60. These cheek plates consist of long bars extending the length of the door plate and seated in the cutaway corners of the flanges. They have turned ends 61 which are bolted to the outside of the plate flanges so that they may be removed. These cheek plates protect the door and upper section from the heat and may be cheaply replaced when burned. In addition to this, I corrugate or groove the abutting faces 62 as clearly shown, for sealing the opening or crack, and for breaking up slag or cinder which would otherwise collect and prevent the door from closing properly. The door 6' may be hinged to the upper section by means of bell-crank levers 18', bolted to the edges of the door and pivoted at 19 to the upper section 6. The arms 18'' of the bell crank levers project substantially at right angles from the door and are connected at their ends by a shaft 20. The door is usually swung open to the position shown in dotted lines 21 in Fig. 2 for charging the furnace, but in discharging the bloom it is only swung open to the position shown in dotted lines 22, and in this position provides an incline down which the bloom may roll by gravity.

Although it is possible to mount the bricks for the end plates in dove-tail grooves in the same manner as the side plates, I prefer to use a number of expansion bolts 23 of the usual type at the joints between the bricks. The bricks 24 of these walls are of the "radial" or "circle" type (Figs. 1, 5, 6 and 7). As shown, particularly in Fig. 7, the plates have flanges 25 on their four outer edges to finish off these edges and to hold the bricks against movement in any direction, but this flange rises only to about half the height of the bricks and the bricks overhang them as at 26 to protect the plate from the heat. The inner ends 27 of the bricks conform to the circular openings 1' and 2' and likewise overlap the inner edges of the plates for protection purposes. The end plates 1 and 2 are set into the respective ends of the furnace so that their outer faces are flush with the edges of the side plates (Figs. 1 and 7). These, like the side plates, are bolted in position, a number of lugs 20 being cast at corresponding intervals around the end plates and side plates adjacent their meeting edges.

I have described the metal working chamber shown in the drawings with considerable particularity in order that a full understanding may be had of both the process and a satisfactory structure by which it may be mechanically carried into effect. The scrap metal practically cold may be charged into the furnace through the door 6' by manual or power shovels or otherwise as desired, the heating chamber being in the position shown in Fig. 2. The charge is spread over the inner wall or surface of the side plate 5, and at this point it may be well to say that, as before intimated, herein lies one of the important advantages of making the chamber rectangular, or substantially so in transverse section. A large area is thus provided over which the charge may be spread and the charge rapidly and thoroughly heated, and as the furnace is rotated or oscillated the charge will be gradually though rapidly massed. The steady rotary or oscillating motion to this furnace continually inclines the side walls, and the metal, due to the action of gravity, continually tends to seek the lower portion of the chamber. In doing this, it is subjected to a rolling or tumbling action, so to speak, which gradually masses it and works out the impurities. In this structure the side walls are straight, that is, the surface or wall which manipulates the metal is disposed in a straight line longitudinally of the furnace and is on the level. As the furnace rotates, this straight, level surface is continually maintained. Hence the metal does not lag at one end but moves uniformly, and the longitudinal axis of the gradually forming mass remains practically parallel to the surface, thus forming a homogeneous, purified bloom. In order to enhance and expedite these forming and manipulating actions, I prefer to make the inner side walls or surfaces somewhat irregular or corrugated. This may be done very easily in this structure by using longer bricks 8' at intervals along the plate surfaces and in the corners, as clearly shown. These may be placed in the dove-tail grooves in such manner as to form longitudinal rows or ridges projecting above the normal brick level. The filling in of the corners rounds off the rectangular path in which the metal travels and the forming of the charge is steadied. The corner at the door is preferably not filled in by longer bricks. This leaves a generally flat surface upon which to charge the cold scrap. As before indicated, the longer bricks 8' perform the function of maintaining the forming charge in a substantially parallel relation to the longitudinal axis of the furnace. In other words there will be less tendency for one end of the charge to lag behind the other. In addition the protruding bricks 8' serve as abutments for the outer ends of the circular bricks on the end plates and positively prevent the circular bricks from leaving the plates.

The rotation or oscillation of the furnace may be accomplished in any suitable manner, even manually, if desired, accordingly as operating conditions permit. In a large furnace weighing several tons like the one herein shown and described, manual operation would be impractical, or at least far too slow. For these reasons I prefer to operate both the furnace and the door by power mechanism, and control these mechanisms from a convenient position in view of the entire apparatus. I support the furnace chamber A centrally between two wheels or rims 35 of comparatively large diameter to provide a balanced structure. These wheels are sufficiently apart to permit free access to the door-plate and the side plate 4. They have short spokes or lugs 36 which are detachably bolted to corresponding offset lugs 37 outstanding from the side plates 3 and 5 as clearly shown in the drawings. The wheels rest upon and are frictionally driven by flanged rollers 38 and 39. These rollers are suitably journaled in bearings in the piers or foundation 40. It is only necessary to drive one set of these rollers (as for instance 38) and this is preferably done by an electric motor (not shown).

The operation of the side door 6' is preferably accomplished by means of a small reversible electric motor M and intermediate mechanism, which may be controlled from the same position and by the same operator as the furnace. The motor and mechanism may be mounted on the outside of the heating chamber. As clearly shown, the motor drives a shaft 41 through the speed reducing worm and gear 42 and 43. This worm and gear also serves as a brake to automatically hold the heavy door in any position in which it is placed. The shaft 41 drives another parallel shaft 44 through the medium of the spur gears 45, which further reduce the speed of the motor. Both shafts 44 and 45 are journaled in bearings 45'. The latter shaft carries two spur pinions 45" which drive a pair of curved toothed racks 46. These racks are maintained in engagement with the pinions by a pair of idler rollers 46' carried by arms 47, swingably mounted on the shaft 45. Corresponding ends of these racks are pivotally journaled on the shaft 20 which connects the arm 18" of the bell-crank levers 18 on the door. In this manner the power of the motor is transmitted to the door at proper speed to open and close the door. It will be noted that the door actuating mechanism is compactly positioned substantially within the confines of the wheels and does not interfere with the rotation or oscillation of the furnace. Furthermore, by reason of the fact that the pivotal points 19 are arranged considerably above the edge of the door and the arms 18, project from these points, a greater leverage may be obtained, shorter racks may be used and the door may be swung clear of the door opening.

In Fig. 1 I have shown diagrammatically a fuel combustion chamber 47 positioned at one end of the furnace, by way of illustrating the manner in which heat may be supplied to the furnace from an external source. This combustion chamber has a stoke-hole 48 and a narrow mouth or throat 49, which is formed between the top wall 50 and the lower bridge 51. The mouth is arranged to supply heat to the interior of the furnace through the open end thereof, and is preferably positioned mainly below the center of the furnace, so as to supply heat as close to the scrap metal as possible at all times during the operating of the furnace. The waste or excess heat and gases pass off through the opposite end opening in the furnace and may be collected by a flue or stack 52 for other heating purposes. The fuel or stack has an opening 53 through which the heat passes, and this likewise is preferably disposed below the center of the furnace. Thus no interference or interruption in the continuous use of the heat for other purposes is occasioned by the operation of the furnace, and the furnace need never be removed from its position, except, perhaps, for the purposes of repair.

It will readily be appreciated, particularly by one who understands the present methods of handling scrap metal, that my invention dispenses with the necessity of employing expensive skilled labor for manipulating the charge. Instead the entire operation may be controlled by one man, and a much greater output may be obtained in less time and at less expense. A large quantity of metal may be charged into the furnace chamber and a workable bloom may be directly produced ready for the mills.

My invention is capable of modification to adapt it to particular operating conditions without departing from the scope and spirit thereof and is to be construed accordingly.

What I claim is:

1. The process of producing blooms directly from scrap metal which consists in heating a loose quantity of scrap metal to a state of plasticity, intermittently rolling the plastic mass always in the same direction and subjecting the same to alternate hammering actions, while confining the ends of the plastic mass to form a homogeneous structure of substantially uniform diameter from end to end.

2. The process of making blooms which consists in heating a quantity of loose scrap metal while tumbling the same to remove surface impurities, and continuing such heating until the metal reaches a state of plasticity while subjecting the mass to intermittent rolling always in the same direction and intermediate or alternate hammering to remove substantially all of the remaining impurities from the metal, and confining the ends of the mass while being rolled and hammered to produce an elongated bloom of substantially uniform diameter from end to end and of homogeneous fibrous structure longitudinally.

3. The process of making blooms which consists in heating particles of scrap iron to a welding temperature, of tumbling the same to remove surface impurities, and intermittently rolling the welded mass while maintaining its axis horizontal and subjecting the welded mass to a hammering action at the end of each rolling action to remove substantially all of the remaining impurities and producing a homogeneous structure, the rolling action being always in the same direction, and the ends of the welded mass being confined to produce a bloom of substantially uniform diameter from end to end.

4. The process of directly converting metal scrap into blooms which consists in heating a suitable quantity of loose scrap metal to a state of viscosity in an inclosed chamber, and continuously rotating in the same direction an endless series of inclined planes under said scrap metal to cause surface impurities thereof to be removed during the first stages of heating and causing the scrap to be welded into a mass which is subjected to intermittent rolling over said inclined planes and intermediate or hammering action when striking against the next succeeding plane, whereby substantially all of the remaining impurities are removed and an integral homogeneous mass of purified material having a longitudinal fibrous structure is produced, the ends of such mass being confined by vertical flat surfaces to cause the purified bloom to be of substantially uniform diameter from end to end.

5. The process of directly converting metal scrap into blooms which consists in heating a substantial quantity of loose scrap to a state of viscosity while the same is being tumbled to remove surface impurities, and continuing such heating while an endless series of inclined planes is continuously moved in the same direction under the metal to cause the same to weld together and then be subjected to intermittent rolling always in the same direction and with the axis of the rolling mass always substantially horizontal, and also subjecting the mass of metal after each rolling to a hammering action to gradually remove substantially all of the remaining impurities, and also confining the ends of the mass of metal while being intermittently rolled and alternately hammered, to produce a bloom of substantially uniform diameter from end to end.

In testimony whereof I have signed my name to this specification, in the presence of two subscribing witnesses, on this 11th day of December, A. D. 1911.

WALTER C. ELY.

Witnesses:
EDGAR F. BEAUBIEN.
ESTÉE WALTON.